United States Patent [19]

Kvisgaard et al.

[11] Patent Number: 5,998,740
[45] Date of Patent: Dec. 7, 1999

[54] METHOD AND APPARATUS FOR WEIGHT CONTROLLED PORTIONING OF ARTICLES HAVING NON-UNIFORM WEIGHT

[75] Inventors: Thorkild Kvisgaard; John Bomholt, both of Hinnerup, Denmark

[73] Assignee: Scanvaegt A/S, Arhus N, Denmark

[21] Appl. No.: 08/809,492

[22] PCT Filed: Sep. 15, 1995

[86] PCT No.: PCT/DK95/00369

§ 371 Date: Mar. 17, 1997

§ 102(e) Date: Mar. 17, 1997

[87] PCT Pub. No.: WO96/08322

PCT Pub. Date: Mar. 21, 1996

[30] Foreign Application Priority Data

Sep. 15, 1994 [DK] Denmark ................................. 1058/94

[51] Int. Cl.[6] .......................... G01G 13/00; G01G 19/40; G01G 13/02; B07C 9/00
[52] U.S. Cl. .................................. 177/25.18; 177/25.19; 177/119; 177/145; 209/645; 209/657
[58] Field of Search ........................... 177/25.18, 25.11, 177/25.12, 25.13, 25.19, 50, 60, 116, 119, 145; 209/645, 657

[56] References Cited

U.S. PATENT DOCUMENTS

| | | | |
|---|---|---|---|
| 4,206,822 | 6/1980 | Mazzucchelli | 177/25.18 |
| 4,313,507 | 2/1982 | Hays | 177/1 |
| 4,418,772 | 12/1983 | Fukuda | 177/25.18 |
| 4,428,179 | 1/1984 | Jordan et al. | 177/50 |
| 4,442,910 | 4/1984 | Mikami | 177/25.18 |
| 4,508,186 | 4/1985 | Sashiki et al. | 177/25.18 |
| 4,632,254 | 12/1986 | Scopatz | 177/25.18 |
| 4,642,788 | 2/1987 | Haze | 177/25.18 |
| 4,836,310 | 6/1989 | Yamano | 177/25.18 |
| 5,074,436 | 12/1991 | Inoue | 177/25.18 |
| 5,270,495 | 12/1993 | Mosher et al. | 177/25.18 |
| 5,319,160 | 6/1994 | Nambu | 177/25.18 |
| 5,719,355 | 2/1998 | Nishimura | 177/25.18 |
| 5,760,342 | 6/1998 | Takeda | 177/25.18 |

FOREIGN PATENT DOCUMENTS

| | | |
|---|---|---|
| 0065820 | 12/1982 | European Pat. Off. . |
| 2 116 732 | 9/1983 | United Kingdom . |
| WO 8302002 | 6/1983 | WIPO . |

*Primary Examiner*—Randy W. Gibson
*Attorney, Agent, or Firm*—Sixbey, Friedman, Leedom & Ferguson; David S. Safran

[57] ABSTRACT

A batching of currently supplied articles with non-uniform weights into portions of a uniform target weight is effected by passing the articles through a weighing station (6, 8) to a distribution system (12), in which the articles (4) are selectively allocated to a plurality of receiver bins (14). It is known to improve the capacity of such a system by way of probability calculations based on the normal distribution of the articles in the supply flow, but it is better to base such calculations on a regularly updated recorded histogram (28) of the weight distribution of a relatively high number of newly weighed articles. Thereby the target calculations will rely on factual rather than just expected conditions, and a result is that it is possible to effect batching even when the article weights in the supply flow are not normally distributed.

17 Claims, 3 Drawing Sheets

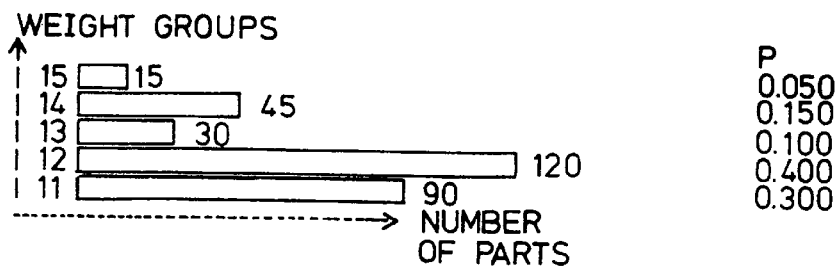
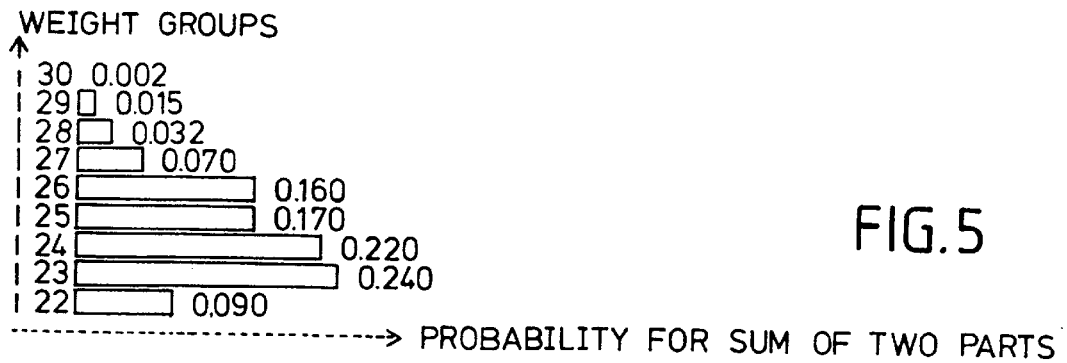
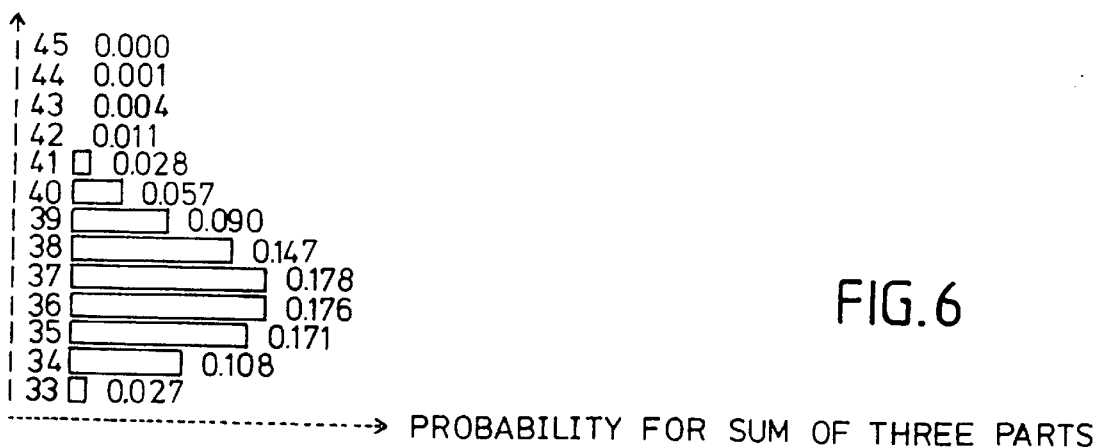
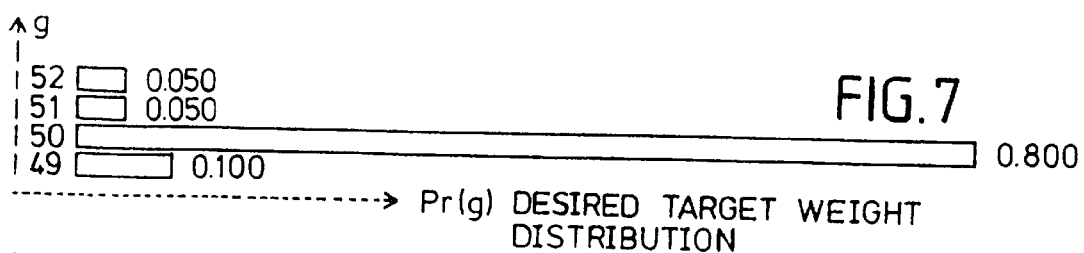
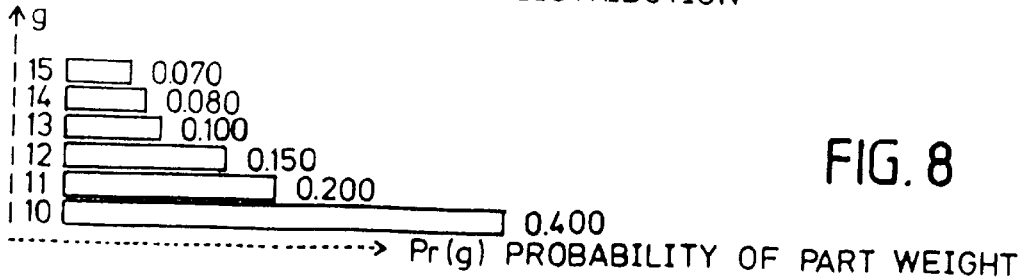

$P_{TM1}(g)$ PROBABILITY FUNCTION FOR ONE MISSING PART.

$P_{TM2}(g)$ PROBABILITY FUNCTION FOR TWO MISSING PARTS $P_{TM3}(g)$ PROBABILITY FUNCTION FOR THREE MISSING PARTS

METHOD AND APPARATUS FOR WEIGHT CONTROLLED PORTIONING OF ARTICLES HAVING NON-UNIFORM WEIGHT

In the food processing industry it is a well known problem that it is difficult to obtain portions consisting of a number of parts (such as pieces of fresh or frozen fish, meat or poultry) when it is additionally required that a pre-determined precise portion weight (possibly with tight tolerances) be combined with a pre-determined number of pieces, in particular in those cases where the weight of the individual pieces deviates in such a manner that the weight distribution of the pieces is non-uniform or changing. Portions having a fixed number of pieces or a number in a chosen interval may be aimed at.

A weight distribution may be normal, whereby the usual concepts 'average and spread' may be used as well as well tested statistical calculation procedures. The weight distribution may also be unusual, because the charge of material which is weighed and treated at an earlier stage may already have been subjected to sorting and possible removal of all items within certain intervals, and this will have removed the possibility for traditional statistical calculations.

Known methods to obtain portions of the kind discussed comprise manual weighing which is a very stressful activity and in most cases the built-in security for the customer in the form of over-weight means a considerable loss for the manufacturer.

Two principally different automatic methods are known: The combination weighing principle and the accumulation weighing principle. In the first, a number of weighed parts or part portions are disposed in a number of weighing bins or in the combination bins of such weighing bins, whereupon, based on the part weights measured, a computer calculates which bin sub portions in combination will constitute the portion which is closest in weight to the predetermined target weight. The limitation of this method is in particular that the number of parts which is available for the combination is limited. In particular when the individual weights of the parts deviate, possibly considerably from each other (as in the case of fish, poultry, or meat) the combinations will often deviate more than is desirable from the target weight, and this will, as in the manual case, mean a loss for the manufacturer.

In the accumulation weighing principle several full portions are currently and even concurrently built up. The individual parts are conveyed forward in a line and are weighed on a dynamic weigher, and the weights are registered successively by a computer which hence keeps track of the relative placement in the line and the respective weights. A distribution unit places the parts selectively in collecting bins, whereby the portions are built up, while the accumulated weights of parts in the individual bins are registered in the computer. The allocation of the individual parts to the various bins continues as long as the accumulated weight in the bin is still below the target weight, until, finally, the bin waits for a part which in the particular portion would just bring the portion weight to the desired value. In order to achieve a reasonable capacity one will have to accept that it may become necessary—and even standard practice—to perform the last discharge with a part which will give an overweight to the portion because it will be an almost lucky coincidence if among the arriving and already weighed parts there will be one which will provide the precise desired total weight.

In the last mentioned method a noticeable improvement has been achieved, cf. GB-C-156-033, in that based on a qualified estimate of the weight distribution in the mass of parts one causes a selective sorting out in such a manner that parts with a weight above and below the average, respectively, are brought together to make part portions which in order to fill to the desired weight need only one or a few parts which have the average weight. The method hence is based on the probability consideration that, cf. the normal distribution, there will be the largest number of those parts which have the respective average weight, whereby the final filling of the portions may occur the fastest when the waiting is for parts of in particular this group.

This method is quite advantageous, once it has been ascertained beforehand, by sampling, what the average weight of the parts is, and in which weight range the parts occur, i.e. what the so-called spread is. The current calculations, based on a preprogrammed normal distribution curve, may be performed with limited data equipment, a.o. because according to normal practice one may allow that a new part may simply be fed to the first of such part portions which waits for a part in the weight class represented by that part, even though, as will be discussed below, the part might have been placed more appropriately in another of these part portions.

However, it has been realized in practice that certainly within the area of the food industry dealt with here it is difficult to retain the knowledge about the weight distribution in the mass of parts as both the average weight and the spread may fluctuate between e.g. different loads of raw material. Furthermore it is in connection with the present invention considered that it may be desirable to create particular assortments from a given mass of parts which would completely change the image of the distribution of the mass which is available for the creation of the portions discussed. As an example, the removal of in particular those parts which have the average weight may entail that there will be no parts available for the conclusion of the portions according to the method described above.

It is a well known practice that a charge is sorted beforehand, e.g. by taking out particular qualities. The portioning equipment could be better utilized if this sorting occurred in conjunction with the portioning, but with the associated deliberate change in the part weight distribution the remaining parts usable for the portioning will no longer exhibit the normal distribution. In this way a sorter or batcher of the said known type is given a task which it is not suited to solve. If it is desired in the industry to work with parts which are reliably present in a normal distribution the raw materials are more expensive which again gives a more expensive finished product.

The present invention relates to a method for portioning which uses certain aspects of the accumulation weighing principle but which makes it possible to distribute the individual parts to the various collection bins for the building of portions essentially independently of the weight distribution of the product parts.

It is a modern trend in the food industry that raw materials are processed one way or the other to a still increasing extent. The raw materials as delivered to the processing industries could well exhibit a normal distribution, but over time it has been a steadily increasing problem that the processed materials, which are to be packed or batched, are no longer normally distributed. Thus, it has been practically impossible or rather expensive to effect batching to a specific target weight and therewith to a fixed price of the packings. Instead, it has become a common practice to batch desired numbers of articles, e.g. four cutlets, and to weigh the individual packings as a basis for an automatic printing of weight and price on associated labels. This technique is fairly simple, but for different reasons all the links in the chain from the processing factory over wholesalers and retailers to customers would in fact prefer packings of fixed weights and prices.

Also, there are special types of packings, which could be good candidates for a "batching to predetermined weight", even without this having crossed the minds of the relevant experts because an automatic batching would seem completely impossible. As an example, it is a well known practice that cheese manufacturers may produce not only whole cheeses, but also larger and smaller pieces of such cheeses, each packed and stamped with weight and price; in this area it is a fully established and preferred practice that the customers can choose between many different piece sizes, inasfar as the pieces will be consumed over a much longer period of time than will four cutlets. Here, the merchandise is one piece only, and that could seem impertinent for the invention. However, in the said chain these pieces are not delivered one by one, but collected in boxes, and typically a retailer will receive one or more boxes with cheese pieces, all ready packed and price marked. In this picture, a potential possibility is that the sender of the box, be it a wholesaler or a manufacturer, could batch the different pieces into the box up to a specific target weight, whereby there would be no need to arrange for a weighing of the filled boxes nor for any accounting for the summed-up weights of the relevant pieces. In many instances, however, this has been practically impossible so far, particularly when pieces of a specific weight have been sorted out, because the pieces to be batched will not, then, exhibit any kind of natural distribution. Any attempt of making such a batching economical based on expectations as to a normal distribution would be completely fruitless, and no other usable methods or means have been disclosed so far.

According to the present invention it has been realized that whatever the starting conditions are, the first higher number of individually weighed articles will be indicative of some factual weight distribution, which can be assumed to be maintained in the future, until factual observations may render it clear that there is some change in the general weight distribution. On this background it is proposed by the invention to arrange for a control unit keeping track of the weights of a plurality of previous articles for determining the factual weight distribution of the received articles. Based thereon, it is possible to statistically calculate the probability of newcoming articles to fit into the already partly established portions, and it has been found that in using the calculation results methodically for diverting the articles to portions selected in this manner, many batching jobs with non-natural article distribution can be effected with a surprisingly high efficiency.

Obviously, conditions may occur under which it would not be feasible to arrange for a batching as here discussed, e.g. if the actual articles are too awkwardly distributed for aiming at any reasonable target weight. In such cases of doubt it will be possible to carry out a test weighing of the article flow and run a simulated batching program, whereby it can be ascertained how successful a batching would be, if arranged for. Under circumstances it could even be found by subsequent analyses that an automatic batching would be feasible if another target weight was chosen or if adjustments were made to affect the weight distribution in some weight range.

As an opposite extreme it has been found that the use of the invention for the batching of normally distributed articles for a variety of distributions seems to give still better results than the said known method.

With the invention it has been realized that with the use of a more advanced data processing system it is possible to currently create a specific picture of the factual weight distribution without relying on any predetermined or preexpected distribution curve based on general statistics. According to the invention the weights of the incoming and currently weighed parts are methodically registered in a serial register basically of the FIFO type (First In, First Out), such that the different weights of a representative number of consecutive parts, for example the latest 50–500 parts, are recorded in such a manner that it is possible to form a histogram or a similar representation of the number of parts located within respective narrow weight ranges, e.g. 5 g as pertaining to an acceptable overweight of 10 g and an acceptable underweight of 5 g. The general picture of the weight distribution may well be rather confuse compared to some standard distribution curve, but at each moment of time it will be notorious that the last plurality of parts was weight distributed according to the said histogram. There is reason to believe, therefore, that even the following parts parts will be equally weight distributed, and the following computations may be based on that expectation.

However, should the factual weight distribution undergo a change for any reason, be it an initiated picking out of all parts of one or more specific weight ranges or a general shift of the material supply to another source of supply, the characteristic distribution histogram will soon adjust itself to the changed situation, such that it will steadily be reasonably representative for the incoming parts, fully independently of statistical norms of distribution. Thus, the histogram may clearly reflect e.g. the absence of all parts of a certain weight category, whether these parts are actually missing in the supply flow or they are successively selected for separate collection in dedicated bins.

With the invention it is acknowledged that the basic philosophy of the said known method of taking advantage of the normal distribution curve is indeed advantageous, but it is also realized that it can be modified to achieve still better results, both generally and in particular whenever the factual distribution is remote from any natural standard. The normal distribution curve is a model of "expected probability", which holds only as long as the distribution really is normal, but according to the invention this is changed into a current analysis of "factual probability", based on the said histogrammic resolution of the observed weight distribution. Admittedly, the practical aspect of the invention is highly dependent of the use of modern computers that can be programmed to carry out such analyses at a minimum of time, but the invention is clear with respect to the underlying reaction criteria.

Based on the histogram it is easy to calculate the probability of the occurrence of parts in the individual weight groups, and it is correspondingly easy to determine which two parts should be brought together in order to form a basic sub portion qualified to be completed with parts, not necessarily of any average weight, but otherwise being predominantly present in the supply flow in order to make up a portion of the desired total weight.

It is highly characteristic for the invention that the current results of the analyses can be used in two different ways, viz. for one thing in deciding for which bin or bins any new part will be suitable, and for another thing in deciding whether that particular part is suited better for one than for others of these bins, instead of the conventional designation of the parts just to the first available recipient calling for or accepting a new part of a specific weight subrange.

For this operation it is required that the computer carries out a detailed analysis of the probabilities of each new part to be successfully added to each of the different bins, in view of the probability of forthcoming parts to fill up the portions to the target weight, derivable from the supply histogram.

This will be a matter of carrying out a series of well defined calculations at the delivery of each new part from the weighing station for rapidly determining the most relevant receiver bin for that new part, purely based on these probability calculations and not on any kind of general expectations. The computer, keeping current account of the fill-up requirements of the individual bins, should also keep track of the histogram of the incoming parts, but this will be a less urgent matter because a noticeable change of the weight of, say, 10–20 new parts will not essentially change the histogram of e.g. 200 preceding parts. It is of course important to register such changes, but for the computer capacity it is very advantageous that these changes should not necessarily be registered immediately. This may admittedly give rise to some less perfect calculations, but only during short periods of time, until a new histogram has been more or less stabilized.

The invention is not limited to the use of a single feeding line, nor to the use of a dynamic weigher. To a given sorter system may be connected several feeding lines, each with a weigher that may well require a dwelling time of the respective parts, and the computer equipment may be correspondingly adapted to handle infeed details from several sources so as to coordinate these details with the requirements of the various receiver bins.

In the following the invention is described in more detail with reference to the drawing, in which:

FIG. 4 is a representation of a histogram of the weight distribution of newly arrived and weighed parts;

FIG. 5 is a representation of the probability of weight summation of two parts;

FIG. 6 is a similar representation relating to the joining of three parts;

FIG. 7 is a corresponding representation of a target weight setting;

FIG. 8 is a similar representation of an associated weight probability function;

Figure 1:
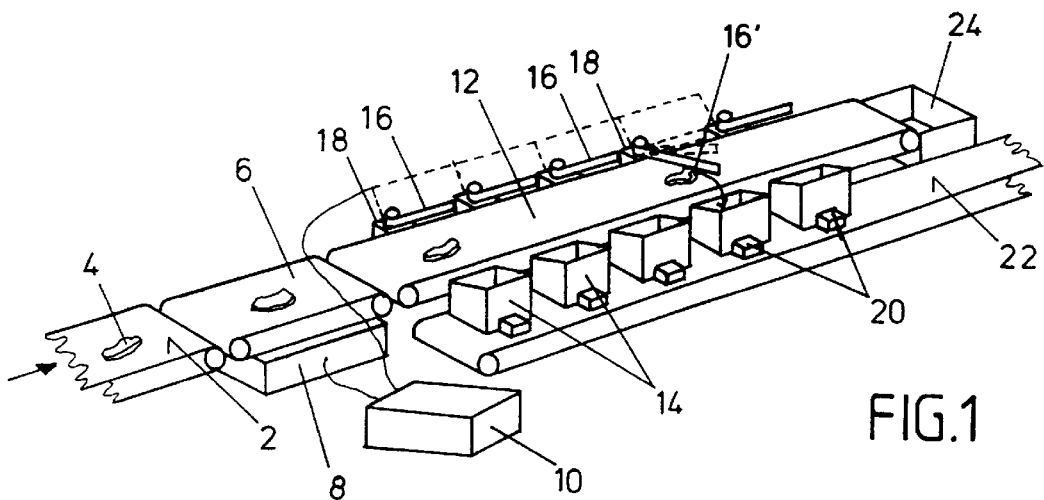
FIG. 1 is a general perspective view of a portioning machine, known per se, but operable to work in accordance with the present invention.

In FIG. 1 is shown a batcher system of a conventional mechanical lay-out. It comprises a feeder conveyor 2, on which parts 4 to be batched are conveyed one by one and brought to a conveyor 6 forming part of a dynamic weigher 8 registering in a computer 10 the weight of the single parts 4. Once weighed, the parts 4 are fed to a sorting conveyor 12 having at one side a row of receiver bins 14 and at the other side a corresponding row of diverter wings 16 with associated actuator units 18 operable to selectively swing the arms into a diverter position as shown at 16', in order to unload a given part 4 into a selected bin 14. The computer 10 controls the operation of the wings 16 so as to effect unloading of parts 4 of particular weights into selected bins, keeping track of the total contents of the individual bins.

All according to the programming of the computer 10 the operation may proceed as a sorting out of parts 4 to build up portions of parts of uniform weight classes or as a batching of parts of different weights in order to build up portions of a predetermined target weight, preferably even with a predetermined number of parts in each portion, e.g. as described in said GB-C-156-033.

Each of the bins 14 has an actuator 20 operable by the computer 10 to open a bottom gate of the bin for selectively dropping the finished portions to appropriate take-away means such as an underlying conveyor 22.

Parts 4 which will not fit in any of the bins 14 will proceed to the end of the conveyor 12 for delivery to a collector box 24 or any other receiver, potentially in order to be recirculated in the system.

The described general lay-out of a batching system will be perfectly applicable in connection with the present invention, which is focussed on the programming of the computer or control unit 10 in order to provide for a highly improved performance of the batching system.

Figure 2:
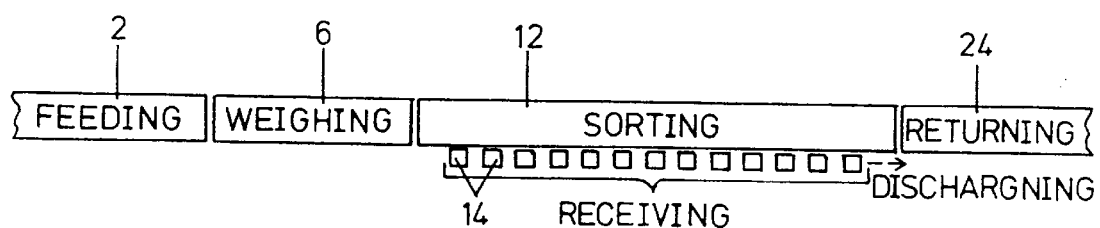
FIG. 2 is a function block diagram of the control system of the machine.
Figure 3:
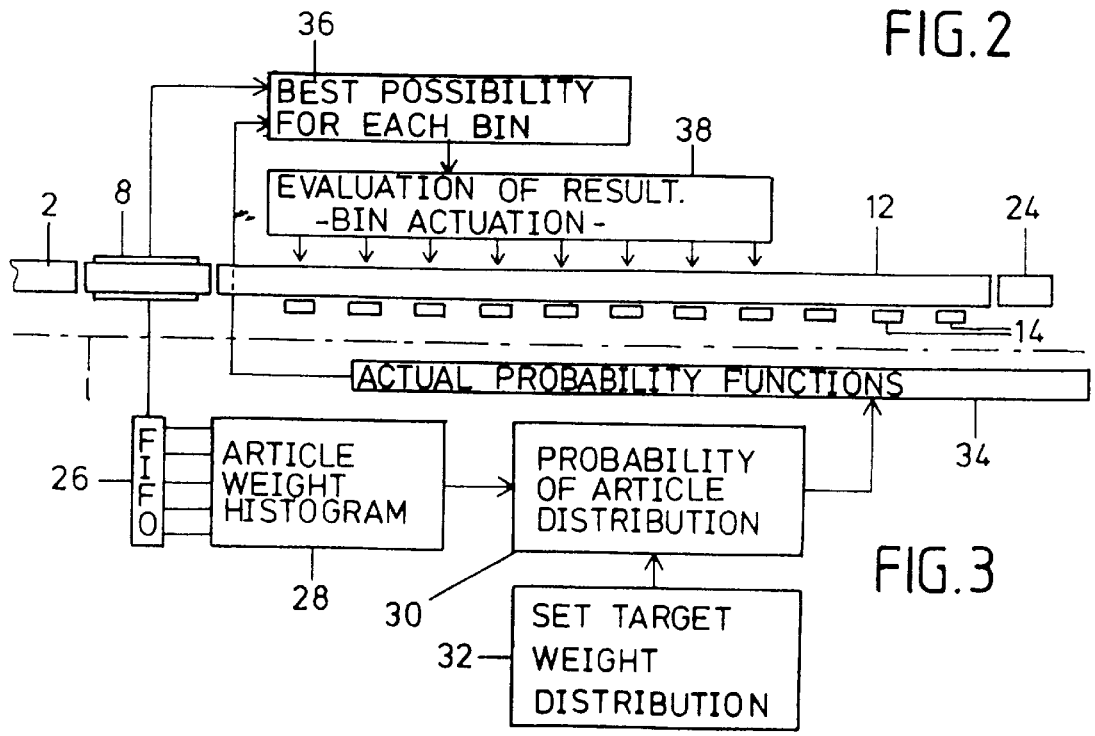
FIG. 3 is a corresponding view, with added function blocks of the control unit.

FIG. 2 shows the same system in blocks, and the same picture is refound in FIG. 3, which illustrates the invention in more detail, with added blocks indicative of the operation of the control unit 10. In FIG. 3 a dotted line 1 divides these blocks in real time operations, above the line, and background operations below the line.

The consecutive results of the weighing of the arriving parts 4 are fed to a FIFO-register 26. After a while this register will hold information of the weighing results of as many parts 4 as desired, e.g. 50–300 parts. Based on this information it is possible, in a unit 28, to build up a histogram picture of the weight distribution of that amount of parts 4, e.g. as shown in FIG. 4.

In the example of FIG. 4 it is assumed that the FIFO-register 26 will hold 300 measuring results and that these are distributed as shown, indicated by number of parts in different weight groups or classes between 105 d (d=weight unit) and 154 d, the individual classes being defined as spanning over 10 weight units, here resulting in group 11 holding 90 parts of weights ranging from 105 to 114 d, group 12 holding 120 parts between 115 and 124 d, and so forth. Out of this histogram it is possible to calculate the probability of the weight of the next arriving part 4, assuming the same distribution, viz. by dividing the part numbers of the individual groups into one. In FIG. 4, the probability of the next part or parts to belong to each of the groups is listed under p, amounting from 5% for group 15 to 40% for group 12.

Based on these figures it is possible to calculate the probability function of the summed-up weight of two parts, now with groups ranging from 22 to 30, merely by multiplying the respective probabilities. However, the probability of two parts joining to a specific weight group will be increased to the extent there are more possibilities for such a formation. In the above example, while group 22 can only be formed by two parts from group 11 (with probability 0.3×0.3=0.09), group 23 can be formed by two different incidents, viz. either a part from group 11 following a part from group 12 or just the opposite. The probability of these incidents is the same (0.3×0.4=0.12), so the combined probability will be twice as high, i.e. 0.24.

Correspondingly, for the further groups there will be still further possibilities of combinations, thus for group 24 the three combinations 11+13, 13+11 and 12+12, amounting to a probability of 0.22. In statistics, of course, there are well established models and formulas that enable a rapid calculation of such combination possibilities or probabilities.

FIGS. 5 and 6 illustrate the probability of combinations of two and three parts, respectively, based on the histogram of FIG. 4.

These calculations are not usable in any direct manner for arriving at a desired target weight, but once a target weight has been chosen it is possible to use corresponding calculations for calculating backwards from the target weight and thus to determine the probability functions when there is lacking any increasing number of parts in the individual bins.

The desired target weight is set in a unit 32, typically with a certain target distribution such as shown in FIG. 7. According to that example, in which the figures are different from those of FIG. 4, it is desired to produce batches of a target weight of 500 d, with a tolerance between −10 d and +20 d for a limited number of batches, giving the target range 49–52. In this example the probability function of the part weight as derived from the histogram of unit 28 may be as shown in FIG. 8, here with the condition that it is desired to make use of parts from groups 10–15 only, i.e. parts of 95–154 d. Parts outside this interval may be automatically sorted out for other purposes, or they may have been removed beforehand.

Figure 9:
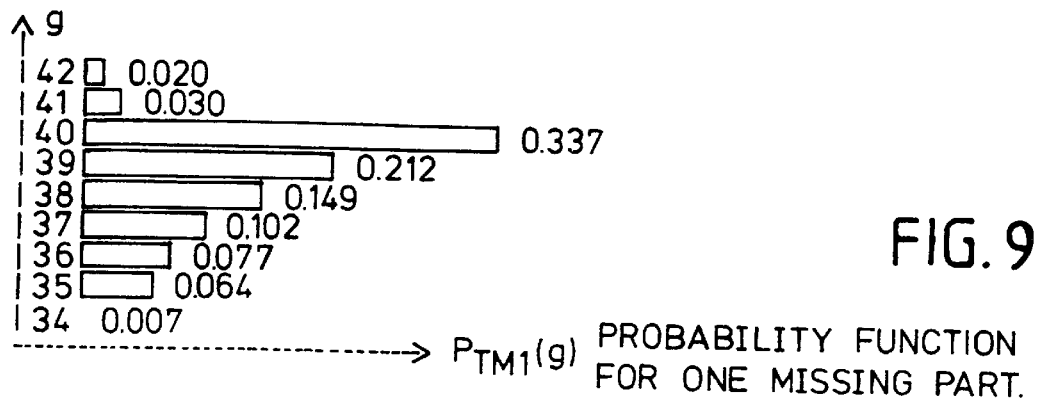
FIGS. 9–11 are representations of probability functions for missing one, two and three parts, respectively.
Figure 10:
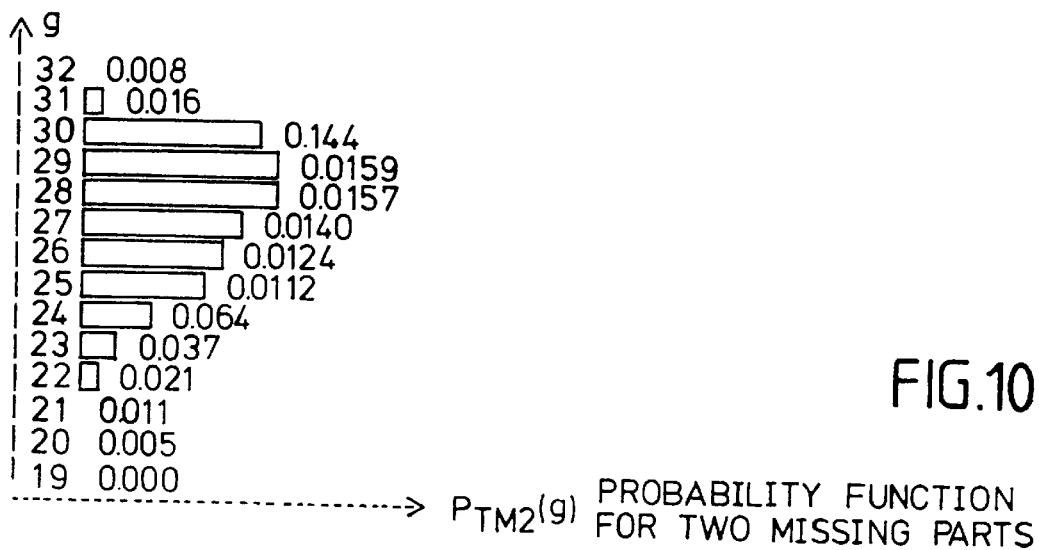
Figure 11:
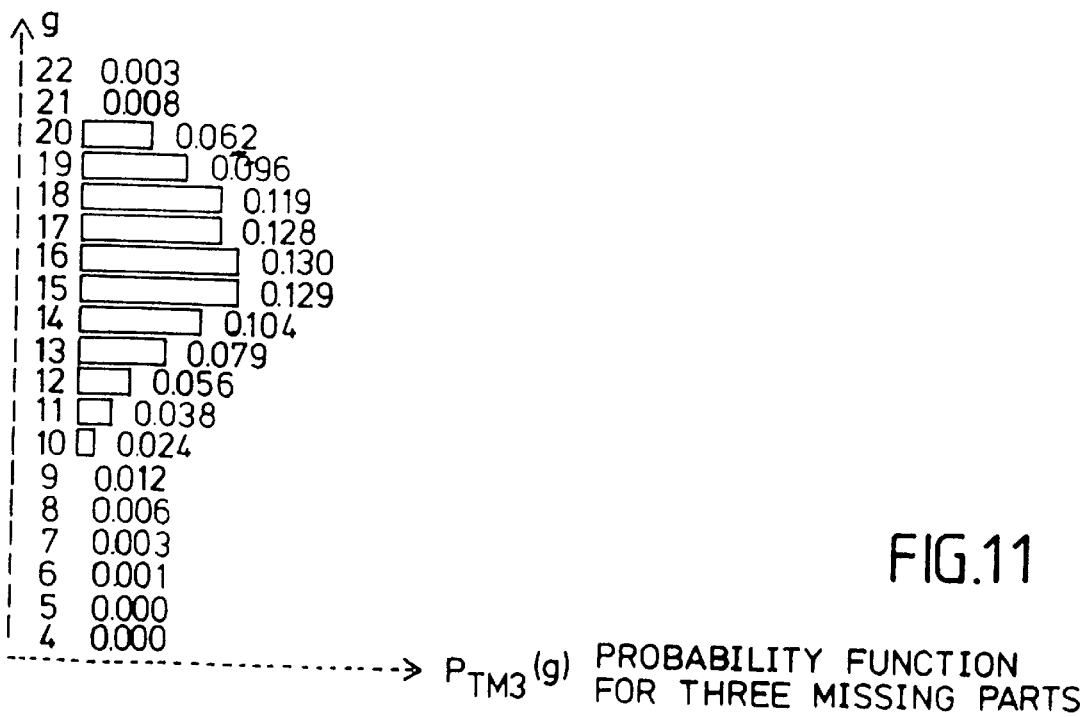

Based on diagrams corresponding to FIGS. 5 and 6 it is possible, as mentioned, to calculate in a unit 34, the general probability function for the parts to be able to fill up to the target weight when one part is missing, this function being shown in FIG. 9. Correspondingly, FIGS. 10 and 11 show the functions when two and three parts are missing, respectively.

The first part for each bin can be selected rather uncritically, because at that time there will be many possibilities for filling up to the desired number at target weight, e.g. to ten parts.

It could even be possible to start with a low number of random parts, the computer 10 keeping account of the total weight in each of the bins. At some level, however, a unit 36 starts comparing the actual weight in each bin, when a known number of parts is missing, with the relevant probability function as provided by the unit 34 (confer FIGS. 8–10). This can be done in the manner that it is calculated, for each bin, how an allocation of the new part for that bin would affect the probability of the bin to thereafter be successfully filled to target weight, IF the part be delivered to that bin. In a unit 38 it is evaluated, according to preset criteria, whether the new part should be allocated to the bin in which the remaining probability for a successful target filling will rise to a maximum for all the bins, or whether the preferred bin should be the one in which the individual probability will enjoy the biggest increase (or, respectively, the smallest decrease). Also, it can be decided that the new part will not fit adequately in any of the bins, whereby it is rejected and moved for recirculation if not usable otherwise.

The signal processing in that part of the system should be in real time, while the units 28, 30 and 34 will only need updating from time to time, as the basic histogram may change, e.g. after the weighing of each 50 new parts.

It will be appreciated that the required calculations are based on the factual histogram. For the operation as such it will make no difference if, for example, the high proportion of parts of some average weight is not present at all or only in a very low proportion. The system will operate perfectly well anyway with all the remaining parts.

There are many possibilities of refining the system according to special desires, of which only a few should be mentioned here. Thus, it may happen that a given bin 'stops', should it be unlucky to steadily be rejected in favour of other bins; if it is desired that all bins should be in regular operation it is possible to add an artificial, small 'additional probability' to any stopped bin and even to increase this addition in time, in order to 'push' the bin into operation, still with a fair probability of becoming filled to target weight.

Of course, the computer 10 can easily keep track of the average weight of the delivered portions, and it can be adjusted such that in case of a negative tolerance on the target weight it will ensure that the average batch weight will not at any time be lower than the target weight itself, this being demanded from many industries; the individual probability functions can be adjusted to prevent batching results giving rise to such a lowering.

The method is perfectly usable for carrying out two or more jobs at the same time, with different target weight distributions and even with graduated priorities. The computer, of course, should have the required increased capacity.

Moreover, the method may be used for 'mixed jobs' such as a batching of different chicken parts in the individual bins, typically two pieces of breast, drumsticks, thighs and wings, respectively, up to a target weight of e.g. 1100 g. Of course, the different types of parts will have different weight probability functions, but these can be calculated together in a multidimensional space. An alternative can be a row of consecutive one-dimensional spaces with mutually different delivery sequences, e.g. with bin 1 sequentially receiving breasts, thighs, drumsticks and wings, and with bin 2 sequentially receiving thighs, drumsticks, wings and breasts, and so forth with different sequential combinations. It should be endeavoured, of course, to select for each bin the relevant double parts with approximately uniform size/weight, but this is an easy matter of programming the computer to this effect. Weight tolerances of one pair of products may be counterbalanced by tolerances of one or more other pairs.

It should be mentioned that the term 'target weight' as used herein, although nominally being a specific weight, may well be defined with tolerances as relevant for the user or for the particular job.

We claim:

1. A method of forming portions of predetermined weights comprised of a plurality of individual articles comprising the steps of:

(A) defining at least one predetermined portion weight in a computer as one of a target weight, a target weight range, and a target weight distribution;

(B) individually weighing each of a series of individual articles to determine the weight thereof;

(C) registering in said computer the weight determined during step (B) for each of the articles together with an indication of a position of the respective article in the series of articles;

(D) delivering the series of individual articles which have been weighed and registered to a distribution system operated by said computer, said distribution system having a plurality of portioning receivers for receiving a number of said individual articles, and transferring means for selectively transferring articles from said series of individual articles into selected ones of said portioning receivers in response to control signals from said computer;

(E) producing a histogrammic representation of the weight distribution of a statistically significant number of newly weighed articles;

(F) performing statistical probability calculations with said computer based on said histogrammic representation of the weight distribution and based on said predetermined portion weight and then, utilizing the results of said calculations to determine a preference for delivery of each newly weighed article to a particular one of said portioning receivers which will generally enhance the probability of a portion of the predetermined portion weight being built-up within the particular portioning receiver; and (G) operating said transferring means to transfer the newly weighed articles into the particular ones of said portioning receivers in accordance with the delivery preferences determined by said computer in step (F).

2. Method according to claim 1, comprising the further steps of dividing said series of individual articles into at least two groups, a first of which is composed of articles that fall, by themselves, into a predetermined weight classification, and a second of which is composed of all other articles; wherein the articles of the first group are sorted out of said series of individual articles and excluded from performance of steps (E) to (F).

3. A method according to claim 1, wherein said steps are performed in a manner concurrently producing at least two portions of mutually different target weights.

4. A method according to claim 1, wherein said series of individual articles is comprised of at least two sub-series having respective different types of products to be co-batched in said portions.

5. A method according to claim 4, wherein the different types of products are transferred to different portioning receivers in mutually different sequences.

6. A method according to claim 1, wherein step (F) comprises the sub-steps of:

calculating a probability function of the portioning receivers receiving articles adding up to said predetermined portion weight based on said factual weight distribution and a desired target weight distribution;

for each newly supplied article, weighing and calculating a statistical probability of that article contributing to successful formation of a target portion in each of the receivers based on the weight of that article and the calculated probability function;

evaluating the results of said calculating steps based on preset priority conditions so as to determine portion receiver to which the newly weighed article should be transferred; and issuing control signals from said computer to said transferring means for causing the newly weighed article to be transferred into a portioning receiver selected by said evaluation.

7. A method according to claim 1, wherein said histogrammic representation of the weight distribution of step (E) is repeatedly updated so as to dynamically include the weights of the most recently weighed articles.

8. A system for forming portions comprised of a plurality of individual articles and having at least one predetermined portion weight defined as one of a target weight, a target weight range, and a target weight distribution, comprising:

(A) means for weighing each individual article of a series of individual articles to determine the weight thereof;

(B) a distribution system having a plurality of portioning receivers for receiving a number of said individual articles, and transferring means for selectively transferring articles from said series of individual articles into selected ones of said portioning receivers;

(C) computer means for receiving the weight determined by said means for weighing and for registering the weight for each of the articles weighed together with an indication of a position of the respective article in the series of articles, said computer means having calculating means for producing a histogrammic representation of the weight distribution of a statistically significant number of newly weighed articles, for performing statistical probability calculations based on said histogrammic representation of the weight distribution and based on said predetermined portion weight and for utilizing the results of said calculations to determine a preference for delivery of each newly weighed article to a particular one of said portioning receivers which will generally enhance the probability of a portion of the predetermined portion weight being built-up within the particular portioning receiver;

wherein said transferring means is responsive to a control signal from said computer means for transferring newly weighed articles into particular ones of said portioning receivers in accordance with the delivery preferences determined by said computer means.

9. A system according to claim 8, comprising means for providing said series of individual articles as at least two sub-series having respective different types of products to be co-batched in said portion receivers.

10. A system according to claim 9, further comprising means for transferring the different types of products to different portioning receivers in mutually different sequences.

11. A system according to claim 8, wherein said computer means includes a FIFO serial register for said registering of the weight for each of the articles and for defining a histogrammic representation in respective narrow weight ranges as said factual weight distribution.

12. A system according to claim 8, wherein said computer means includes a target weight distribution unit for enabling reading in of a desired target weight distribution for the portion receivers which reflects a permissible percentage of portions in different adjacent weight ranges near a nominal target weight of portions to be formed.

13. A system according to claim 11, wherein said calculating means performs said statistical probability calculations based on said histogrammic representation defined by said serial register for determining a probability function of newly weighed articles being combinable with articles already in the portion receivers to achieve the predetermined portion weight.

14. A system according to claim 12, further comprising comparator means for comparing the probabilities of a newly weighed article successfully contributing to the building up of the predetermined portion weight in each of said portion receivers, and for actuating said transferring means to deliver the newly weighed article to the one of said portions receivers in which the newly weighed article is most likely to successfully contribute to the building up of the read-in predetermined portion weight for the portion receivers.

15. A system according to claim 8, wherein said calculating means for producing a factual weight distribution includes means for only periodically updating.

16. A system according to claim 14, wherein said computer means is operable for adjusting the effect of the statistical probability calculations so as to increase the likelihood of articles being sent to a portioning receiver repeatedly having less than said highest probability when said portioning receiver having less than said highest probability has not received any articles during a period in which articles have been steadily delivered to other receivers.

17. A system according to claim 16, said computer means is operable for repeated adjusting the effect of the statistical probability calculations to increase the likelihood of articles being sent to the portioning receiver repeatedly having less than said highest probability until said portioning receiver repeatedly having less than said highest probability receives an article.

* * * * *